May 29, 1962  F. H. CHAMBERS ET AL  3,036,620
MULTI-PLY TIRE REPAIR UNIT
Filed Dec. 19, 1960  2 Sheets-Sheet 1

INVENTORS
FRANK H. CHAMBERS &
GAIL B. MOATS.
BY
MAHONEY MILLER & RAMBO ATTY'S
BY Wm. V. Miller May 29, 1962

F. H. CHAMBERS ET AL 3,036,620

MULTI-PLY TIRE REPAIR UNIT

Filed Dec. 19, 1960

INVENTORS
FRANK H. CHAMBERS &
GAIL B. MOATS.
BY
MAHONEY MILLER & RAMBO ATTYS.

BY

United States Patent Office 3,036,620
Patented May 29, 1962

3,036,620
MULTI-PLY TIRE REPAIR UNIT
Frank H. Chambers and Gail B. Moats, Johnstown, Ohio, assignors to Technical Rubber Company, Inc., Johnstown, Ohio, a corporation of Ohio
Filed Dec. 19, 1960, Ser. No. 76,656
1 Claim. (Cl. 152—367)

This invention relates to a multi-ply tire repair unit known in the trade as a section tire repair unit. It has to do, more particularly, with a patch for reinforcing injured pneumatic tire casings and which includes a plurality of reinforced ply members disposed in superimposed relationship, an underlying body of non-abrasive rubber which prevents the rough edges of the injury opening from wearing through the plies, and an underlying attaching layer of uncured, vulcanizable rubber of substantial thickness and of novel characteristics so that it will be readily vulcanizable by the running temperature of the tire casing to form a bond between the cured rubber of the plies and non-abrasive body of the repair unit and the cured rubber wall of the tire casing.

The repair unit of this invention is an improvement over the tire patch disclosed in the patent to Cornell No. 2,344,677 which is dated March 21, 1944.

According to this invention the uncured vulcanizable attaching layer is preferably a calendered layer of uncured or vulcanizable rubber of substantial thickness. This layer of uncured rubber is such that road heat developed in the tire or the running temperature of the tire, which is from 160° F. up, will vulcanize or cure the uncured rubber layer and will thereby form an effective bond between the cured rubber of the abrasive body and plies of the repair unit and the cured rubber of the tire casing around the injury opening. This bond is accomplished without the use of additional heat or reacting chemicals. The running temperature of the repaired tire will bring about cure or vulcanization of the uncured layer because of the nature of the layer. This layer has a high sulfur content and a particular type of accelerator incorporated therein. The sulfur and accelerator are used in such relative amounts and the accelerator is of such a nature that the running temperature of the tire, which may be as low as 160° F., will be sufficient to produce curing or vulcanizing of the layer and vulcanizing to the cured portions of the repair unit and the cured wall of the tire casing, thereby to produce an effective bond therebetween. Furthermore, this bond is produced without the use of any additional reactive chemical agents applied to the layer at the time of positioning over the injury opening. Furthermore, the nature of the uncured layer is such that the sulfur and accelerator will not react until the temperature thereof is brought up to about 160° F. which will insure that the repair unit will have indefinite shelf-life.

A preferred embodiment of this invention is illustrated in the accompanying drawings and in these drawings.

Figure 1:
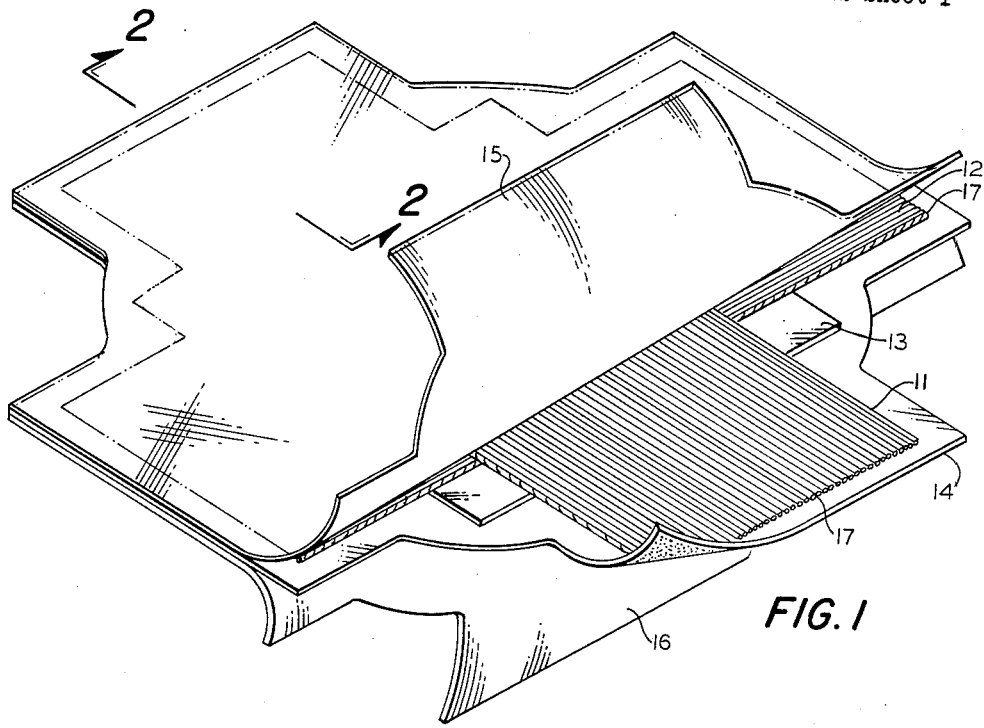
FIGURE 1 is an isometric view, partly cut away, showing a complete repair unit according to this invention with layers thereof peeled apart for purpose of illustration.
Figure 2:
FIGURE 2 is a partial sectional view taken transversely through a portion of the unit of FIGURE 1 substantially at the location indicated by the line 2—2 of FIGURE 1, but with the protective films removed for clarity.

With reference to the drawings, there is illustrated in FIGURES 1 and 2, a tire repair unit or patch according to this invention which embodies the superimposed crossed cord ply members 11 and 12, a body of non-abrasive rubber 13 which underlies portions of the crossed ply members, an underlying and extended layer of cushion gum 14 which completely underlies the body 13 and extensions of the ply members 11 and 12, and respective upper and lower protective covers 15 and 16. The latter two covers may be of plastic film, paper or other suitable material, and have no function in the actual operation of the repair unit, being provided merely to protect the upper and lower surfaces of the repair unit from contact with other surfaces and from dirt. For clarity, the protective films 14 and 15 are removed from the unit in FIGURE 2. The repair unit is adapted to be inserted into a pneumatic tire casing illustrated at T in FIGURES 3 and 4 over an injury opening I therein to be repaired. This tire casing will usually be of the type which receives a tube, although the invention is applicable to tubeless tires also, and the repair unit will be vulcanized in final position by the running temperature of the tire after it is mounted and used on a wheel and road heat is developed therein.

The cord plies 11 and 12 are of rubberized cord and are similar to the cord plies of a tire. Each cord ply 11 or 12 has the cords therein extending in one direction only. In the drawings, the cord plies are shown as being of strip or rectangular form and the cords are shown extending longitudinally thereof but it is to be understood that the plies may be in the form of square pads or in other forms. The cord ply 11 is placed on the ply 12 in crossed relationship thereto, so that the cords in the two plies preferably extend substantially at right angles to each other but may be in other angular relationship. Thus, in this example there are four projecting tab ends or extremities on the cord ply arrangement, each extremity being indicated at 17.

Figure 3:
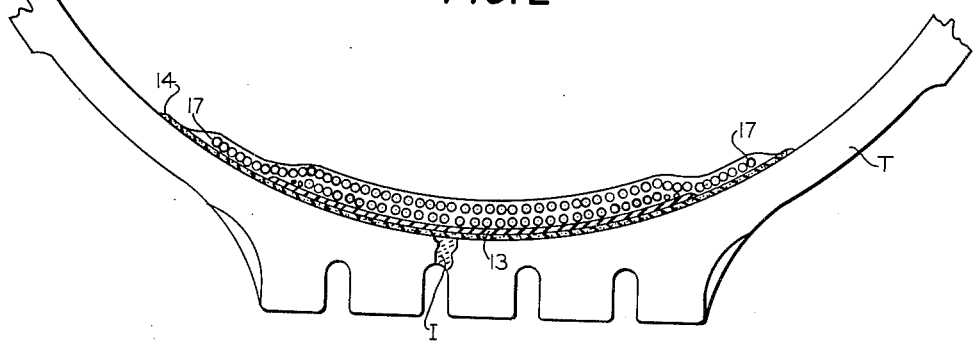
FIGURE 3 is a sectional view of the repair unit taken along line 3—3 of FIGURE 4, showing it positioned in a tire casing, a portion of which is indicated schematically.
Figure 4:
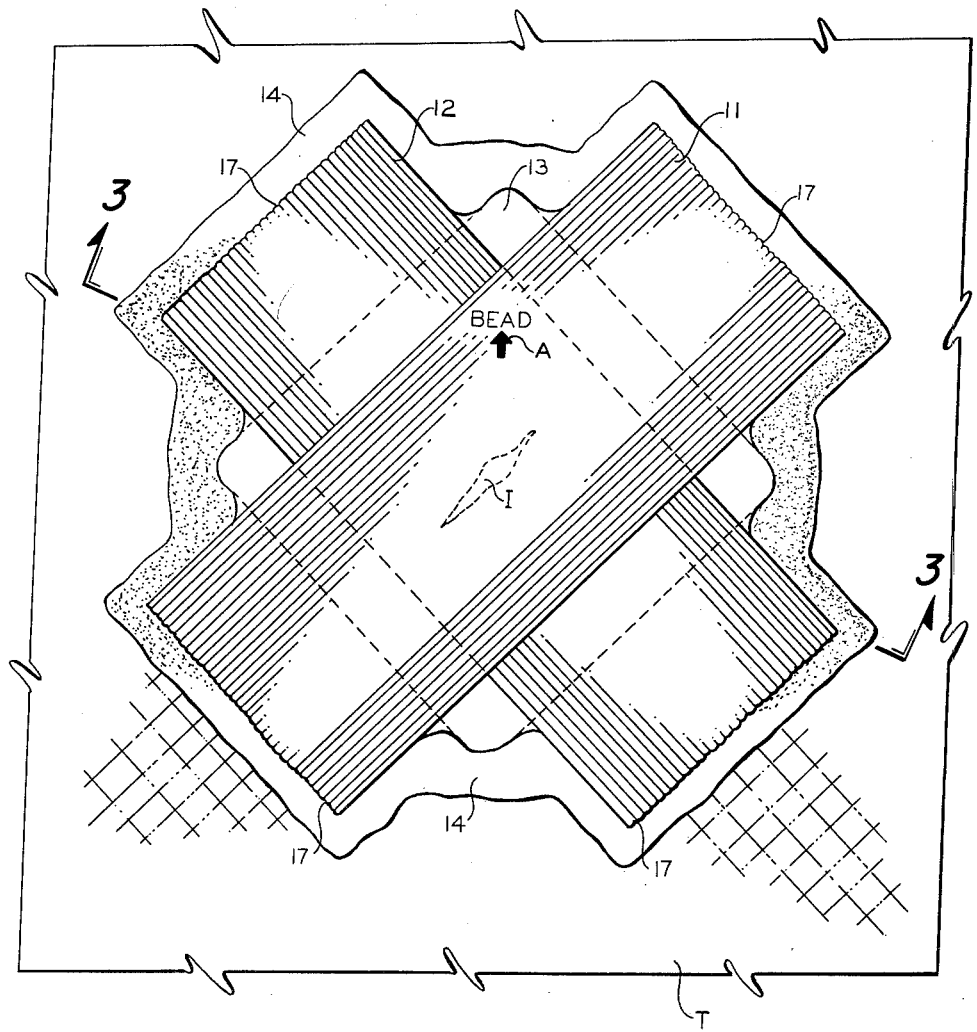
FIGURE 4 is a face view, partly cut away, of the repair unit which has been vulcanized in a tire casing, a fragment of which is illustrated schematically.

Underlying the crossed areas of the plies 11 and 12 and preferably extending outwardly beyond the crossed areas is the body layer 13 of non-abrasive rubber which serves to protect the lowermost ply from the rubbing action of the edges of the injury opening I in the tire casing T after the repair unit is positioned therein and the tire casing flexes during use. This layer 13 is relatively heavy being at least .031 inch in thickness but usually heavier. This body layer 13 is vulcanized under heat and pressure to the crossed plies 11 and 12, all of these members preferably being vulcanized together in a flexible bed press at the same time. The crossed plies 11 and 12 will have their four ends projecting outwardly beyond the protective body layer 13 of abrasive rubber. The curing of the crossed plies and the body layer 13 together will result in feather edges on the four projecting tab ends or extremities of the cord ply arrangement. The curing will also result in feather edges on the body layer 13 and in the rounding of its corners but for the purpose of clarity these features are not shown in FIGURE 1. However, the feather edges and rounding of the corners are illustrated in FIGURES 2 to 4.

The vulcanized unit including crossed plies 11 and 12 and body layer 13 are positioned on the underlying layer of cushion gum 14. This layer 14 underlies the complete area of the crossed plies and the body layer 13 and extends beyond such area in all directions and, in fact, will project therefrom a greater distance after being positioned and vulcanized in the tire casing where it spreads and has a feather edge. When the vulcanized unit, including the plies 11 and 12 and the layer 13, is positioned on the uncured layer 14 of cushion gum, vulcanizable rubber cement may be used between the unit or assembly and the cushion gum to cause them to more effectively adhere. This cement is preferably a good quality rubber-base cement which is preferably substantially free of sulfur and accelerator. After positioning in the tire casing, the unit is cured in position so that the cushion gum will cure and bond the cord ply assembly to the tire casing merely by the temperature developed in running the tire. The curing of the layer 14 on the tire will result in a spreading of it and feather edges on it as illustrated in FIGURE 3.

The attaching layer 14 is of uncured or unvulcanized elastic rubber and is a substantial thickness of solid rubber material known as quick-cure cushion stock which is preferably calendered and will vulcanize easily and effectively at relatively low temperatures without pressure. This layer should be at least 0.010 inch in thickness and is preferably of 0.015 inch or more in thickness. Incorporated in this uncured rubber layer 14 are certain type accelerators along with a high sulfur content so that road heat alone will produce curing. Also, this layer is such that shelf-life of the repair unit will be maintained indefinitely.

In order that the layer 14 can be cured solely by the running temperature of the tire, it is provided with a special type accelerator along with a high sulfur content so that it will cure at a relatively low temperature of from 160° F. to 180° F., and of course, at any higher running temperature of the tire in which the repair unit is inserted. However, so that the repair unit will have indefinite shelf-life, the uncured layer will not be cured at the normal temperatures to which the repair unit is subjected before use which are normally less than 100° F. but may be somewhat higher. The sulfur content of the layer is preferably 14% by weight of the rubber used in the compound of the layer but may range from 5% to 18%. The accelerator used in the layer is from the thiourea family and diphenylthiourea has been found to be most satisfactory when used in amounts of 7% by weight of the rubber used in the compound of the layer. However, any accelerator of the group can be used and be present in amounts varying from 5% to 9% by weight of the rubber used in the layer compound.

The repair unit, after removal of the protective films or covers 15 and 16, a positioned in the tire casing with the cushion gum layer 14 in contact with the inner surface of the tire casing T and over the injury opening I, as shown in FIGURES 3 and 4. An arrow A may be provided on the uppermost cord ply to indicate that the unit should be mounted with the arrow extending toward the bead of the tire so that when the unit is thus mounted, the cords of the two plies 11 and 12 will extend in substantially the same directions as the cords in the corresponding plies of the tire. The directions of these cords relative to those in the tire casing are illustrated diagrammatically in FIGURE 4. Although the cords in the ply members are shown extending in the same directions as the cords in the tire casing, this is not absolutely essential though it is desirable. However, the cords of the ply members should extend in the same general directions as the corresponding ones in the tire casing. As previously indicated, the repair unit may include more than two superimposed cord ply members as shown. When the repair unit is mounted in the tire casing, its entire lower surface, that is the lower surface of the layer 14 and the inner surface of the tire casing around the injury I, are coated with cement so that the repair unit will stick in place until the tire is run sufficiently to develop the vulcanizing temperature of 160° F. or more. This cement is preferably of the type previously mentioned. It will be understood that the tube used in the tire casing will also apply some pressure to the repair unit to aid in holding it in place until it self-vulcanizes. The rubberized cord plies 11 and 12 will extend over the injury and will flex with the tire casing during its rotation. The body layer 13 of non-abrasive, flexible rubber, commonly known as high tensile, low abrasion tread stock, will protect the adjacent cord ply from the rubbing and wearing action of the rough edge of the injury I which flexes during rotation of the tire casing.

With the repair unit held firmly in position in this manner, if the tire is now used, the road heat developed during usage will be sufficient to vulcanize the unit in its initially held position. This heat will be at least 160° F. and is usually 180° F. or more. This vulcanization will occur with the layer 14 becoming sufficiently heated to cause reaction between the sulfur content and accelerator content thereof so that the layer will connect or bond the cured plies 11 and 12 and body layer 13 to the cured rubber of the casing T. This vulcanization will be enhanced by the pressure of the tube pushing the layer 14 outwardly against the wall of the tire casing.

The cement between the cord ply and non-abrasion rubber pad assembly and the layer 14, as well as the cement on the wall of the tire casing around the injury opening, will also be cured or vulcanized because even though it does not have sulfur and accelerator therein, excess amounts of these agents will migrate from the layer 14, after being heated by the running temperature of the tire, into the cement so as to cause curing or vulcanizing of the cement.

We have made actual tests, with tire casings repaired by our units in which a layer corresponding to the layer 14 contained 7% of the accelerator diphenylthiourea and 14% sulfur. These units were cured in the tires at a temperature of approximately 180° F. comparable to the running temperature of a tire. These tests showed that the cured layer had the following indicated hardnesses after varying periods of curing:

| Time, hours: | Shore hardness |
| --- | --- |
| 2 | 32 |
| 4 | 35 |
| 8 | 43 |
| 16 | 47 |

Furthermore, thousands of these repair units have actually been used in repairing both conventional and tubeless tire casings and road heat alone has effectively vulcanized the units in position.

It will be apparent that this invention provides for a novel type of repair unit in which reinforced rubberized plies are provided for strength and are protected by the non-abrasive rubber pad from damage by the rough edge of the injury opening. The uncured attaching layer, which will vulcanize by road heat alone serves to bond the cured rubber assembly of the repair unit to the cured rubber wall of the tire casing during use of the tire. The bond will be so effective that the repair unit cannot be displaced from its position over the injury opening. The uncured layer contains a high sulfur content and a special accelerator in such relative amounts that the indicated bond will result after the unit is applied to the tire and the tire is run for a short period. No chemicals or additional heat need be used to obtain the self-vulcanizing of the repair unit in the tire. Furthermore, although the uncured rubber layer is vulcanizable by road heat, it will have indefinite shelf-life at normal temperatures. Other advantages will be apparent.

According to the provisions of the patent statutes, the principles of this invention have been explained and have been illustrated and described in what is now considered to represent the best embodiment. However, it is to be understood that, within the scope of the appended claim, the invention may be practiced otherwise than as specifically illustrated and described.

Having thus described this invention, what is claimed is:

A tire repair unit comprising a plurality of rubberized cord plies arranged in superimposed crossed angular relationship, a protective body layer of non-abrasive, unreinforced rubber disposed beneath the crossed areas of said cord plies, said plies projecting outwardly beyond the non-abrasive protective body to provide tab ends positioned outwardly beyond the corresponding edges of said body, and an attaching layer of uncured vulcanizable rubber having a thickness at least 0.010 inch disposed beneath said plies and in direct contact with said tab ends and said body layer and extending outwardly beyond said tab ends and body layer, said attaching layer containing sulfur and an accelerator in such amounts that said uncured rubber layer is readily vulcanizable by the running temperature of the tire, about 160° F. or more, after the unit is positioned in a tire over an injury opening in contact with the band ply of the tire with the protective body located over the injury opening and with the said tab ends extending outwardly therefrom so that the tab ends as well as the protective body will be bonded to the tire band ply by the cured layer which will bond the cured rubber of the body and tab ends to the cured rubber of the tire band ply.

References Cited in the file of this patent

UNITED STATES PATENTS

| | | |
|---|---|---|
| 1,440,963 | Cadwell | Jan. 2, 1923 |
| 1,631,354 | Ayres | June 7, 1927 |
| 1,897,927 | Domzalski | Feb. 14, 1933 |
| 2,852,058 | Chambers et al. | Sept. 16, 1958 |